(12) United States Patent
Hu et al.

(10) Patent No.: US 10,664,976 B2
(45) Date of Patent: May 26, 2020

(54) METHOD FOR PART MOBILITY PREDICTION BASED ON A STATIC SNAPSHOT

(71) Applicant: Shenzhen University, Shenzhen, Guangdong Province (CN)

(72) Inventors: Ruizhen Hu, Shenzhen (CN); Hui Huang, Shenzhen (CN)

(73) Assignee: Shenzhen University, Shenzhen (CN)

( * ) Notice: Subject to any disclaimer, the term of this patent is extended or adjusted under 35 U.S.C. 154(b) by 186 days.

(21) Appl. No.: 15/872,001

(22) Filed: Jan. 16, 2018

(65) Prior Publication Data
US 2019/0066308 A1 Feb. 28, 2019

(30) Foreign Application Priority Data
Aug. 31, 2017 (CN) .......................... 2017 1 0768864

(51) Int. Cl.
*G06K 9/00* (2006.01)
*G06T 7/20* (2017.01)
(Continued)

(52) U.S. Cl.
CPC .............. *G06T 7/20* (2013.01); *G06K 9/2054* (2013.01); *G06K 9/6215* (2013.01);
(Continued)

(58) Field of Classification Search
None
See application file for complete search history.

(56) References Cited

U.S. PATENT DOCUMENTS

| 2011/0273442 A1 | 11/2011 | Drost et al. |
| 2014/0105506 A1 | 4/2014 | Drost et al. |
| 2018/0089815 A1 | 3/2018 | Hu et al. |

FOREIGN PATENT DOCUMENTS

| CN | 102236794 A | 11/2011 |
| CN | 103729643 A | 4/2014 |
| CN | 106485743 A | 3/2017 |

OTHER PUBLICATIONS

Guerrero, Paul, Niloy J. Mitra, and Peter Wonka. "RAID: a relation-augmented image descriptor." ACM Transactions on Graphics (TOG) 35.4 (2016): 46. (Year: 2016).*

(Continued)

*Primary Examiner* — Sean M Conner
(74) *Attorney, Agent, or Firm* — Harness, Dickey & Pierce, P.L.C.

(57) ABSTRACT

A method for part mobility prediction based on a static snapshot consisting of several steps: constructing mobility units from each 3D model in a set of 3D models with parts segmented according to their motion and grouping all of the mobility units according to their motion type; computing snapshot descriptors for every static snapshot in a mobility unit; learning a snapshot-to-unit distance measure for every motion types of the mobility units; getting the most similar mobility unit and its motion type for a query static snapshot by using the snapshot-to-unit distance measure to select with the minimum distance value; generating multiple motion candidates for a query static snapshot according to the achieved mobility unit and its motion type, sampling the generated motion and getting the best motion parameter for the query static snapshot. This invention can predict the part mobility from a static snapshot of an object.

15 Claims, 13 Drawing Sheets

(51) Int. Cl.
  *G06K 9/66* (2006.01)
  *G06K 9/62* (2006.01)
  *G06K 9/20* (2006.01)

(52) U.S. Cl.
  CPC ............. *G06K 9/6262* (2013.01); *G06K 9/66* (2013.01); *G06T 2207/10012* (2013.01)

(56) References Cited

OTHER PUBLICATIONS

Zhao, Xi, He Wang, and Taku Komura. "Indexing 3d scenes using the interaction bisector surface." ACM Transactions on Graphics (TOG) 33.3 (2014): 22. (Year: 2014).*

Pirk S, Krs V, Hu K, et al. Understanding and Exploiting Object Interaction Landscapesp[J]. arXiv preprint arXiv:1609.08685, 2016.

Grabner H, Gall J, Van Gool L. What makes a chair a chair?[C]// Computer Vision and Pattern Recognition (CVPR), 2011 IEEE Conference on. IEEE, 2011: 1529-1536.

Kim V G, Chaudhuri S, Guibas L, et al. Shape2pose: Human-centric shape analysis[J]. ACM Transactions on Graphics (TOG), 2014, 33(4): 120.

Savva M, Chang A X, Hanrahan P, et al. SceneGrok: Inferring action maps in 3D environments[J]. ACM transactions on graphics (TOG), 2014, 33(6): 212.

Savva M, Chang A X, Hanrahan P, et al. PiGraphs: Learning interaction snapshots from observations[J]. ACM Transactions on Graphics (TOG), 2016, 35(4): 139.

Hu R, Zhu C, van Kaick O, et al. Interaction context (icon): Towards a geometric functionality descriptor[J]. ACM Transactions on Graphics (TOG), 2015, 34(4): 83.

Hu R, van Kaick O, Wu B, et al. Learning how objects function via co-analysis of interactions[J]. ACM Transactions on Graphics (TOG), 2016, 35(4): 47.

Kry P G, Pai D K. Interaction capture and synthesis[C]//ACM Transactions on Graphics (TOG). ACM, 2006, 25(3): 872-880.

Zhu Y, Zhao Y, Chun Zhu S. Understanding tools: Task-oriented object modeling, learning and recognition[C]//Proceedings of the IEEE Conference on Computer Vision and Pattern Recognition. 2015: 2855-2864.

Wei P, Zhao Y, Zheng N, et al. Modeling 4d human-object interactions for joint event segmentation, recognition, and object localization[J]. IEEE transactions on pattern analysis and machine intelligence, 2016.

Sharf A, Huang H, Liang C, et al. Mobility-Trees for Indoor Scenes Manipulation[C]//Computer Graphics Forum. 2014, 33(1): 2-14.

Schultz M, Joachims T. Learning a Distance Metric from Relative Comparisons[C]//NIPS. 2003, 1: 2.

Fish N, Averkiou M, Van Kaick O, et al. Meta-representation of shape families[J]. ACM Transactions on Graphics (TOG), 2014, 33(4): 34.

* cited by examiner

US 10,664,976 B2

METHOD FOR PART MOBILITY PREDICTION BASED ON A STATIC SNAPSHOT

TECHNICAL FIELD

This invention is about part mobility prediction technique for 3D object, especially the method for part mobility prediction based on a static snapshot.

BACKGROUND

Recently in the shape analysis field, an increasing effort has been devoted to obtaining a functional understanding of 3D objects from their geometries and interactions. In this setting, the functionality of an object is learned by analyzing how humans or virtual agents may interact with the object and how closeby objects are related to it geometrically. Typically, such knowledge is acquired from static snapshots of the object and its surroundings, e.g., a chair with a human sitting on it or a table with several objects on top. In a first attempt, Pirk et al. [1] describe object functionalities by capturing and analyzing dynamic object trajectories, e.g., the motion of a moving agent attempting to sit on a chair. Yet, in all of these previous works, the central object maintains its rigidity.

In order to solve the above-mentioned issues, the existing techniques has been adopted the object functionality analysis from static snapshot. There are several specific examples: Affordance-based methods simulate a human agent to predict the functionality of objects [2][3], or to recognize the regions of a scene that enable a human to perform certain actions [4][5]. The interaction context descriptor [6] and functionality models learned for categories [7] consider more general object-object interactions.

Although some of those methods [2][3][4][5] involve the dynamics of human interactions, they do not extend to more general types of object affordances. In the methods [6][7] mentioned above, object-object interactions are static in nature.

In order to solve above mentioned issues, the existing techniques preform object functionality analysis from dynamic interactions. The recent work of Pirk et al. [1] performs functionality inference from dynamic interaction data. The key difference to our work is that they characterize functionalities of static objects by analyzing dynamic interactions, e.g., how a cup can be used in the dynamic action of drinking coffee. However, the analyzed objects are not dynamic themselves. As a consequence, their analysis is performed at the object-level, and not at the part-level as in our work. Moreover, a line of works in the literature target the capture of dynamic interactions. Kry and Dinesh [8] propose a method to acquire the details of hand interactions. The work focuses on the use of specialized hardware for acquiring the interactions, and does not leverage the motion information to represent the functionality of objects. Recent work in computer vision [9] aims at capturing the functionality of tools or representing general human interactions [10]. However, the focus of these works is in recognition, and thus the derived functionality representations are not intended for grouping or transferring part mobility.

In order to solve above mentioned issues, the existing techniques preform part mobility analysis from indoor scenes. The approach of Sharf et al. [11] builds a mobility tree that summarizes the support relations between objects or parts in a scene, and their relative mobility. First, the input scene is analyzed in search of repeated instances of objects or parts. Next, given a repeated model detected in distinct configurations, the method discovers the possible motions that the model can undergo.

One limitation of this approach is that it relies on the occurrence of repeated models in the input scene, appearing in different states of motion, e.g., open and closed drawers. Thus, the detected mobility cannot be easily transferred to objects that do not appear in the scene, since the motion is discovered separately for each instance.

REFERENCE

[1] Pirk S, Krs V, Hu K, et al. Understanding and Exploiting Object Interaction Landscapes[J]. arXiv preprint arXiv: 1609.08685, 2016.
[2] Grabner H, Gall J, Van Gool L. What makes a chair a chair?[C]//Computer Vision and Pattern Recognition (CVPR), 2011 IEEE Conference on. IEEE, 2011: 1529-1536.
[3] Kim V G, Chaudhuri S, Guibas L, et al. Shape2pose: Human-centric shape analysis[J]. ACM Transactions on Graphics (TOG), 2014, 33(4): 120.
[4] Savva M, Chang A X, Hanrahan P, et al. SceneGrok: Inferring action maps in 3D environments[J]. ACM transactions on graphics (TOG), 2014, 33(6): 212.
[5] Savva M, Chang A X, Hanrahan P, et al. PiGraphs: Learning interaction snapshots from observations[J]. ACM Transactions on Graphics (TOG), 2016, 35(4): 139.
[6] Hu R, Zhu C, van Kaick O, et al. Interaction context (icon): Towards a geometric functionality descriptor[J]. ACM Transactions on Graphics (TOG), 2015, 34(4): 83.
[7] Hu R, van Kaick O, Wu B, et al. Learning how objects function via co-analysis of interactions[J]. ACM Transactions on Graphics (TOG), 2016, 35(4): 47.
[8] Kry P G, Pai D K. Interaction capture and synthesis[C]// ACM Transactions on Graphics (TOG). ACM, 2006, 25(3): 872-880.
[9] Zhu Y, Zhao Y, Chun Zhu S. Understanding tools: Task-oriented object modeling, learning and recognition [C]//Proceedings of the IEEE Conference on Computer Vision and Pattern Recognition. 2015: 2855-2864.
[10] Wei P, Zhao Y, Zheng N, et al. Modeling 4d human-object interactions for joint event segmentation, recognition, and object localization[J]. IEEE transactions on pattern analysis and machine intelligence, 2016.
[11] Sharf A, Huang H, Liang C, et al. Mobility—Trees for Indoor Scenes Manipulation[C]//Computer Graphics Forum. 2014, 33(1): 2-14.
[12] Schultz M, Joachims T. Learning a Distance Metric from Relative Comparisons[C]//NIPS. 2003, 1: 2.
[13] Fish N, Averkiou M, Van Kaick O, et al. Meta-representation of shape families[J]. ACM Transactions on Graphics (TOG), 2014, 33(4): 34.

SUMMARY OF THE INVENTION

This invention proposes a method for part mobility prediction based on a static snapshot, which only use few snapshots in a mobility unit to learn a motion model and predict the motion from a static snapshot of an object.

To achieve such a goal, the present invention proposes a method for part mobility prediction based on a static snapshot, which includes:

constructing mobility units from each 3D model in a set of 3D models with parts segmented according to their motion and grouping all of the mobility units according to their motion type. The mobility unit contains several static snapshots. The motion types depend on the motion parameters. The motion parameters include: motion type, direction of the candidate axis, position of the candidate axis, and range;

computing snapshot descriptors for every static snapshot in a mobility unit. The descriptor is represented by several multi-dimensional geometric features, and describes the interaction and spatial configuration between a moving part and a reference part in a static snapshot;

learning a snapshot-to-unit distance measure for every motion types of the mobility units by using metric learning method;

getting the most similar mobility unit and its motion type for a query static snapshot by using the snapshot-to-unit distance measure to select with the minimum distance value;

generating multiple motion candidates for a query static snapshot according to the achieved mobility unit and its motion type. Sample the generated motion and get the best motion parameter for the query static snapshot.

In an embodiment, the static snapshots in the mobility units include start snapshot and end snapshot.

In an embodiment, the static snapshots in the mobility unit are ordered according to the time sequence of the moving part.

In an embodiment, the motion parameters include: motion type, the main direction of the translation axis or rotation axis, the position of the translation axis or rotation axis, motion range.

In an embodiment, the static snapshot descriptors in every mobility unit include: using the Interaction Bisector Surface to capture the interaction between the moving part and the reference part, and the interaction region between the surface of the parts and Interaction Bisector Surface;

using the Relation-Augmented Image Descriptor to represent the spatial configuration between the moving part and the reference part.

In an embodiment, use the Relation-Augmented Image Descriptor to represent the spatial configuration between the moving part and the reference part, which includes:

replacing the 2D pixel in the Relation-Augmented Image Descriptor with the 3D voxel. Extend the circle in 2D to the sphere in 3D, using three orthogonal planes in 3D to divide the space of the sphere, and dividing the sphere into internal and external spheres by the radius of the sphere and obtain 16 partitions in total.

In an embodiment, learn a snapshot-to-unit distance measure for every motion types of the mobility units by using metric learning method, which includes:

using metric learning method, under the condition of two types of constraints, to learn the snapshot-to-unit distance measure for each motion type of the mobility units according to the geometrical characteristics of the static snapshots in the mobility units. The constraints include:

Snapshots should be kept closer to units with the same type of motion as themselves, rather than to units with a different type of motion.

The distance from snapshots of the same type as the unit should be smaller than the distance from snapshots not of the same type as the unit.

In an embodiment, the similar mobility units are grouped according to the motion types.

In an embodiment, construct the snapshot-to-unit distance measure:

$$D^{SU}(s_k^i, u_j) = \frac{1}{2}(D_{W_j}^S(s_k^i, s_1^j) + D_{W_j}^S(s_k^i, s_m^j))$$

where $s_1^j$ and $s_m^j$ are the start and end snapshots of unit $u_j$, respectively, and m is the number of snapshots used to represent each unit. 4 is a static snapshot of a mobility unit, $D_{W_j}^S$ is the distance between two static snapshots.

In an embodiment, get the most similar mobility unit and its motion type for a query static snapshot by using the snapshot-to-unit distance measure to select with the minimum distance value, which includes:

using the distance measure to compare the distances between the query static snapshot and mobility units, choose the mobility unit with the minimum distance value.

In an embodiment, generate multiple motion candidates according to the achieved mobility unit and its motion type for a query static snapshot, sampling the generated motion, and getting the best motion parameter for the query static snapshot, which include:

generating the initial motion parameters for the query static snapshot;

generating multiple motion candidates according to the initial motion parameters and sample a set of snapshots for every motion;

computing the distances between the static snapshots of each set and the predicted mobility unit. Determine the best motion parameters by the set of snapshots with the minimum distance value;

using the best motion parameters to define the motion for the query static snapshot.

In an embodiment, the motion type of the best parameters may be the same as that of the predicted mobility unit.

In an embodiment, generate multiple motion candidates according to the initial candidate motion parameters and sampling a set of snapshots for each motion, which includes:

using different candidate axes to generate additional snapshots for the query static snapshot;

extending the query static snapshot on both sides to have additional snapshots based on the motion axis and the motion type;

evaluating the validity of the extended snapshots;

grouping the valid extended snapshots for every motion.

In an embodiment, extend the query static snapshot on both sides based on the motion axis and the motion type, which includes:

For translation, translating the moving part starting from of the query static snapshot along the two possible directions of the translation axis;

For rotation, rotating the moving part in two possible directions of the rotation axis of the query static snapshot.

In an embodiment, evaluate the validity of the extended snapshots, which includes: In the case of the two parts collide, judging if most of the intersection is confined to the interaction region of the reference part. If true, the snapshot is valid;

In the case of there is no collision, judging if closest distance between the moving and the reference parts are smaller than twice the set threshold. If true, the snapshot is also valid.

To achieve such a goal, this invention provides a computer device comprising: a memory, a processor as well as a computer program stored on the memory and runnable on the processor, the processor executes the following steps when executing the computer program:

constructing mobility units from each 3D model in a set of 3D models with parts segmented according to their motion and grouping all of the mobility units according to their motion type. The mobility unit contains several static snapshots. The motion types depend on the motion parameters. The motion parameters include: motion type, direction of the candidate axis, position of the candidate axis, and range;

computing snapshot descriptors for every static snapshot in a mobility unit. The descriptor is represented by several multi-dimensional geometric features, and describes the interaction and spatial configuration between the moving part and the reference part in a static snapshot;

learning a snapshot-to-unit distance measure for every motion types of the mobility units by using metric learning method;

getting the most similar mobility unit and its motion type for a query static snapshot by using the snapshot-to-unit distance measure to select with the minimum distance value;

generating multiple motion candidates for a query static snapshot according to the achieved mobility unit and its motion type. Sample the generated motion and get the best motion parameter for the query static snapshot.

To achieve such a goal, this invention provides computer-readable storage medium, the computer-readable storage medium stores a computer program and the computer program comprises steps of:

constructing mobility units from each 3D model in a set of 3D models with parts segmented according to their motion and grouping all of the mobility units according to their motion type. The mobility unit contains several static snapshots. The motion types depend on the motion parameters. The motion parameters include: motion type, direction of the candidate axis, position of the candidate axis, and range;

computing snapshot descriptors for every static snapshot in a mobility unit. The descriptor is represented by several multi-dimensional geometric features, and describes the interaction and spatial configuration between the moving part and the reference part in a static snapshot;

learning a snapshot-to-unit distance measure for every motion types of the mobility units by using metric learning method;

getting the most similar mobility unit and its motion type for a query static snapshot by using the snapshot-to-unit distance measure to select with the minimum distance value;

generating multiple motion candidates for a query static snapshot according to the achieved mobility unit and its motion type. Sample the generated motion and get the best motion parameter for the query static snapshot.

With this invention, only use few snapshots in a mobility unit can learn a motion model and predict the motion from a static snapshot of an object.

BRIEF DESCRIPTION OF THE DRAWINGS

In order to more clearly describe the technical solutions in the embodiments of the present invention or the prior art, accompanying drawings to be used in the descriptions of the embodiments or the prior art will be briefly introduced as follows. Obviously, the accompanying drawings in the following descriptions just illustrate some embodiments of the present invention, and a person skilled in the art can obtain other accompanying drawings from them without paying any creative effort.

DETAILED DESCRIPTION OF THE EMBODIMENTS

Figure 1:
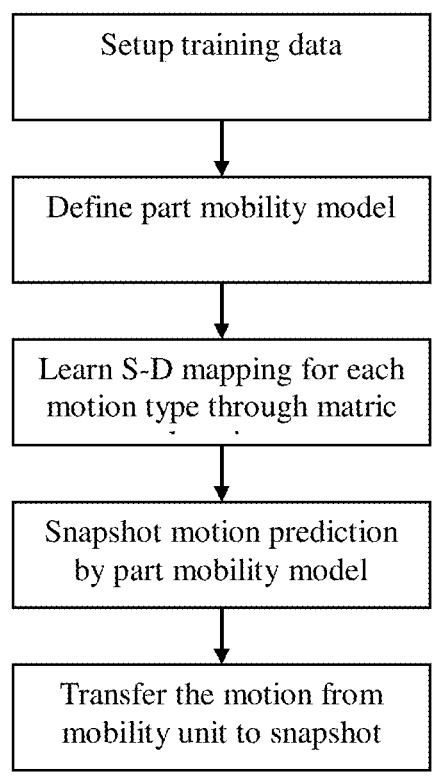
FIG. 1 shows the pipeline of the proposed method of part mobility prediction based on a static snapshot.

The technical solutions in the embodiments of the present invention will be clearly and completely described as follows with reference to the accompanying drawings of the embodiments of the present invention. Obviously, those described herein are just parts of the embodiments of the present invention rather than all the embodiments. Based on the embodiments of the present invention, any other embodiment obtained by a person skilled in the art without paying any creative effort shall fall within the protection scope of the present invention.

One of the goal of this invention is to learn a model of dynamic part mobilities. The model can be used to predict the mobility of unknown parts, when given only a static configuration of the parts. Thus, this invention is searching for a direct mapping of the static snapshot to a dynamic motion type. This mapping is called the S-D mapping. Computing such a mapping is challenging since it has to take into account the variety of part motions, as well as the diverse geometric variations possible. The same motion type can be manifested in many different geometries and by many different part configurations. Simply searching for geometric similarity using the snapshot will mean that it needs to store examples of all geometry types possible, and all spatial and temporal configurations for each geometry type, which is impractical.

To alleviate these challenges, it's observed that many part mobilities afforded by everyday objects exhibit some form of linearity, but in different spaces. For example, drawers undergo linear translations in the spatial domain, while rotations about a hinge are linear in angle space. Such linearities make it possible to characterize and learn part mobilities from a few static snapshots. Oftentimes, only the start and end snapshots for a particular part motion are necessary to define the motion. Consequently, a characterization for the intermediate states of this motion, by means of linearity, is simply that the sum of distances from such a state to the start and end motion states remains approximately invariant.

This invention introduces a method for learning a part mobility model, which enables an understanding of dynamic functionalities characterized by the movements of one or more parts in a 3D object. Specifically, the learned model can predict part mobilities from only a static snapshot of the spatial configuration of the relevant parts in 3D space. The training data in this invention consists of a set of mobility units, each of which is composed of a pair of 3D object parts along with usage examples consisting of few, typically 2-4, snapshots capturing different motion states of the unit. The key is to learn a mapping from static snapshots to mobility units. Taking advantage of a linearity characteristic exhibited by most part motions in everyday objects, the present invention defines a meaningful snapshot-to-unit distance as the sum of distances from the static snapshot to the start and end snapshots of the mobility unit. Furthermore, the snapshot-to-snapshot distance is defined by a set of geometric descriptors, whose weights are motion-dependent and learned through metric learning.

The goal of this invention is to learn a part mobility model which enables prediction of part mobilities from static snapshots. The training data consists of a set of mobility units, each of which is composed of a pair of parts of a 3D object (a moving part, and a part that serves as reference to the motion), along with usage examples consisting of few, typically 2-4, snapshots capturing different motion states of the unit in its spatial context. The key is to learn the S-D mapping, which enables motion prediction, and does not only rely on geometric similarity. The mapping requires measuring distances from a query static snapshot of an object to mobility units (possibly of other objects). This invention defines the snapshot-to-unit distance as the sum of distances from the query static snapshot to the start and end snapshots of target units. Under the linearity assumption, this sum should be similar for similar types of motion. Thus, the problem of defining a snapshot-to-unit distance is reduced to defining a meaningful distance between snapshots.

This invention defines the snapshot-to-snapshot distance using a set of geometric descriptors, for instance, to encode spatial part relations. However, the linearity assumption of each unit type holds in different motion spaces that is not known in advance. If simply use the same distance with uniform weighting of the descriptors for all unit types, it could get poor prediction results. In this invention, using different descriptor weights can define a distance that approximates the correct motion space. Using metric learning in a supervised manner defines the motion-dependent weights for each motion type. During prediction, this invention maps a given snapshot to one of the mobility units in the training set based on the learned snapshot distance measure and the snapshot-to-unit distance derived from the linearity assumption. FIG. 1 shows the pipeline of the proposed method of part mobility prediction based on a static snapshot.

This invention divides the analysis into a training stage for learning the model, and a prediction stage for learning the model, and a prediction stage where the model is used to infer the mobility of parts. The following are specific steps.

Figure 2:
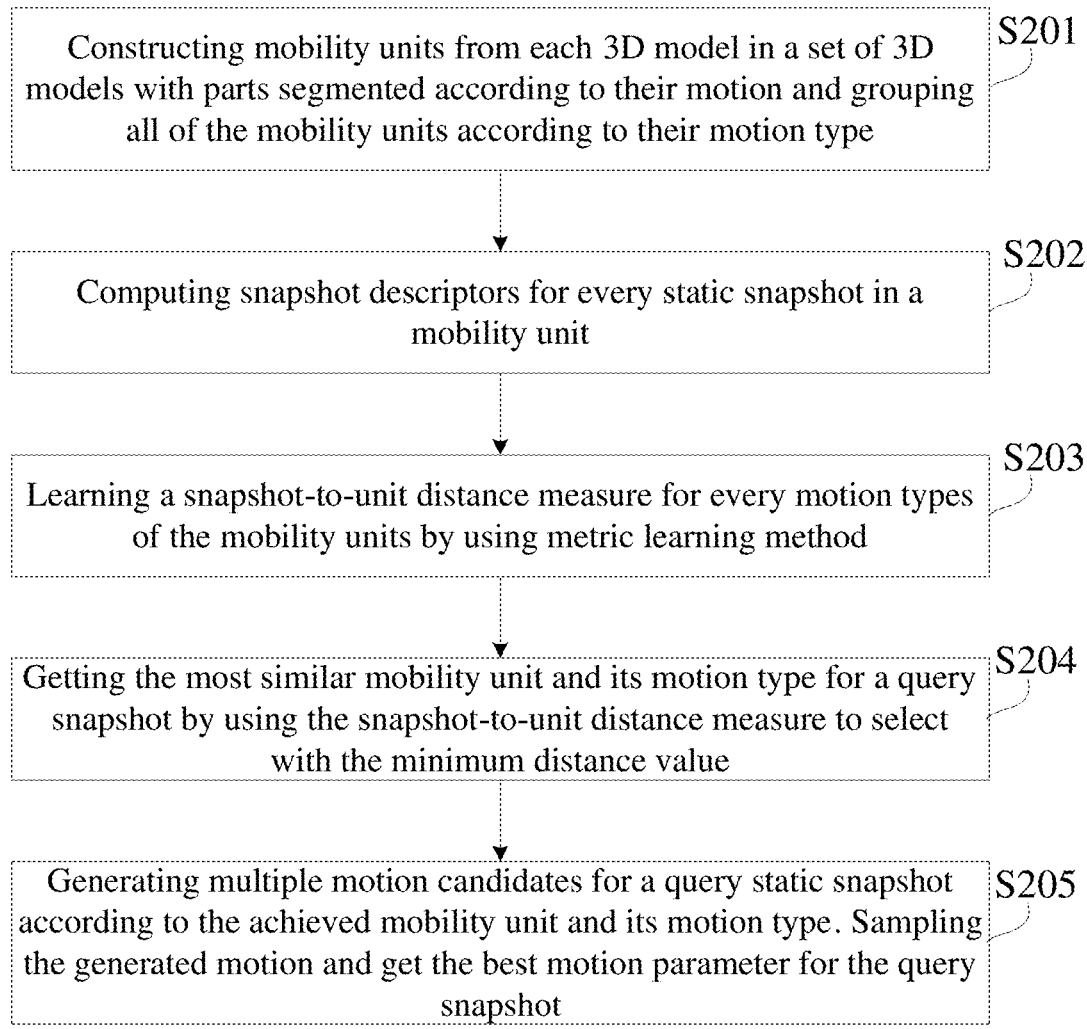
FIG. 2 shows how the method of part mobility prediction based on a static snapshot works in this invention.

FIG. 2 shows how the method of part mobility prediction based on a static snapshot works in this invention. As illustrated in FIG. 2, the part mobility prediction method includes:

S201: Construct mobility units from each 3D model in a set of 3D models with parts segmented according to their motion and grouping all of the mobility units according to their motion type. The mobility unit contains several static snapshots. The motion types depend on the motion parameters. The motion parameters include: motion type, direction of the candidate axis, position of the candidate axis, and range;

S202: Compute snapshot descriptors for every static snapshot in a mobility unit. The descriptor is represented by several multi-dimensional geometric features, and describes the interaction and spatial configuration between the moving part and the reference part in a static snapshot;

S203: Learn a snapshot-to-unit distance measure for every motion types of the mobility units by using metric learning method;

S204: Get the most similar mobility unit and its motion type for a query static snapshot by using the snapshot-to-unit distance measure to select with the minimum distance value;

S205: Generate multiple motion candidates for a query static snapshot according to the achieved mobility unit and its motion type. Sample the generated motion and get the best motion parameter for the query static snapshot.

Through the method mentioned in the FIG. 2, only use few snapshots in a mobility unit can learn a motion model and predict the motion from a static snapshot of an object.

Figure 3:
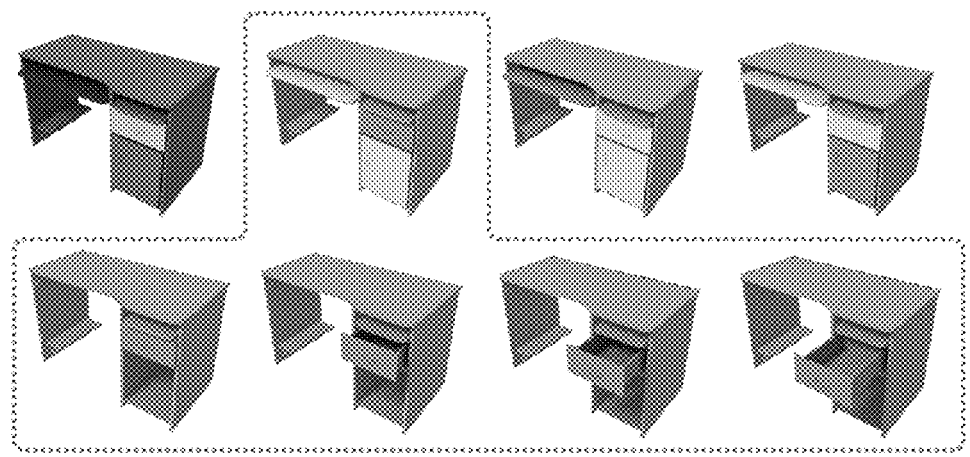
FIG. 3 shows how the training data setups in this invention.
Figure 4:
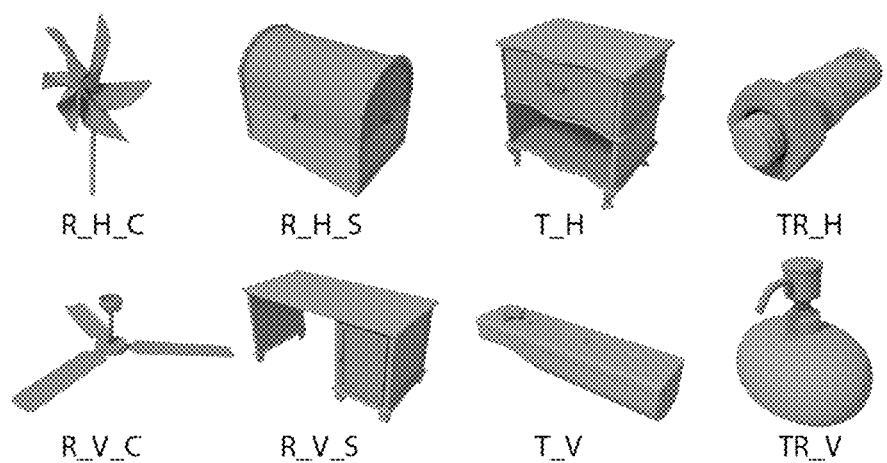
FIG. 4 shows the classification of the training units into motion types in this invention.

S201 is about training data setup. The input to the training is a set of shapes with parts segmented into separate geometries. The parts are grouped into mobility units, where each unit is composed of a moving part and a reference part, e.g., a drawer that moves and the furniture frame that serves as a reference for the motion. The complete input consists of a few static configurations of each mobility unit, which are called snapshots. The snapshots are given at different states of the motion, e.g., drawer fully-open, drawer half-open, etc. An example of the input is shown in FIG. 3. It is ensured that the start and end snapshots of each unit are included, and it is assumed that the unit of origin of each snapshot is known, where the snapshots are ordered in a unit according to the movement of the parts in time. The present invention also takes as input a rough classification of the units into general types of motion, e.g., wheel rotation, sliding lids, rotating lids, etc., to build the model based on user guidance. Any type of classification can be used by our learning, however, specifically in our dataset, the classification is based on the parameters of the motion. These parameters, included in the labels of the units, then aid with the motion transfer. The parameters include transformation type (translation, rotation, or both, denoted as T, R, and TR), general direction of the translation or rotation axes (horizontal or vertical, denoted as H and V), and location of the axes (close to the center of the units or to one of their sides, denoted as C or S). The dataset in the present invention contains a large variety of motions in everyday life. The present invention uses the parameters to classify the units into 8 motion types. One example unit for each motion type is shown in FIG. 4. The present invention provides this classification as an initial grouping to the method. Refer to the label in FIG. 4, each of which shows an example of a mobility unit.

Part mobility model and the process of the part mobility prediction in this invention are as follows.

The model of dynamic part mobility is composed of a representation of the units in the training data and the S-D mapping, which allows us to map static snapshots to mobility units. The S-D mapping for each motion type is learned from the training data via metric learning. Then, given a static snapshot of a pair of parts, the present invention uses the S-D mapping to predict the motion that the moving part can support. Specifically, the present invention follows a nearest-neighbor classification approach, where the present invention computes the distance from the snapshot to the different mobility units in the training data, using the snapshot-to-unit distance measure learned for each motion type, and select the unit with the lowest distance value. Next, the present invention transfers the motion from the unit to the snapshot.

Figure 5A:
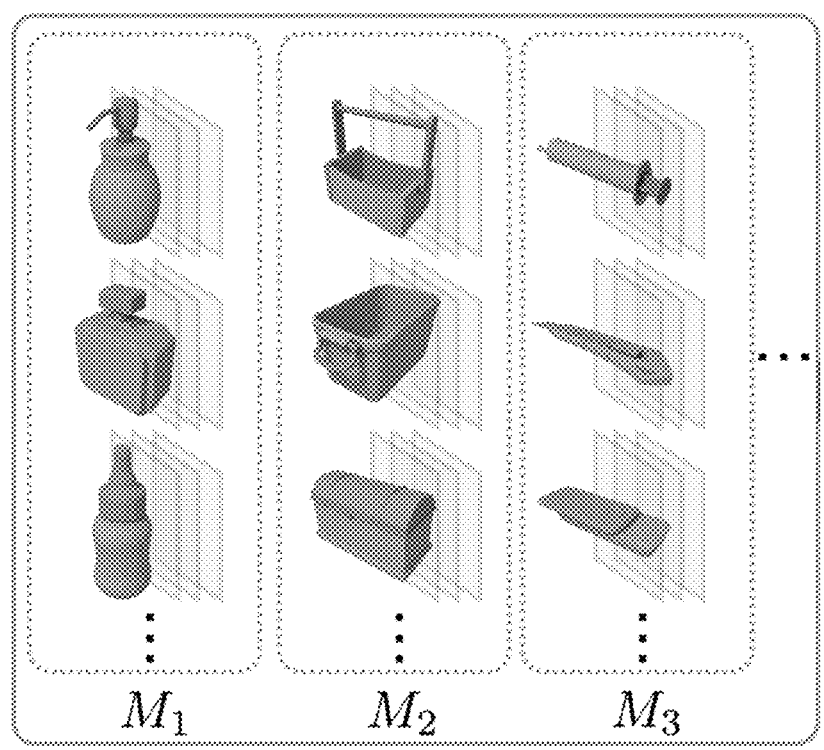
FIG. 5A-5C shows the process of the learning and predicting the part mobility in this invention.
Figure 5B:
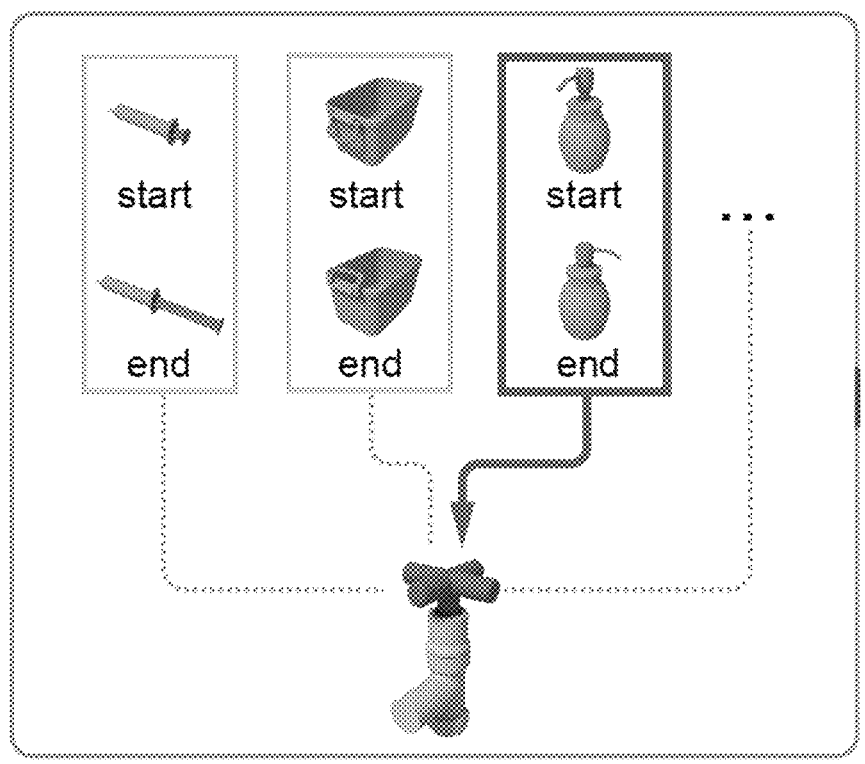
Figure 5C:
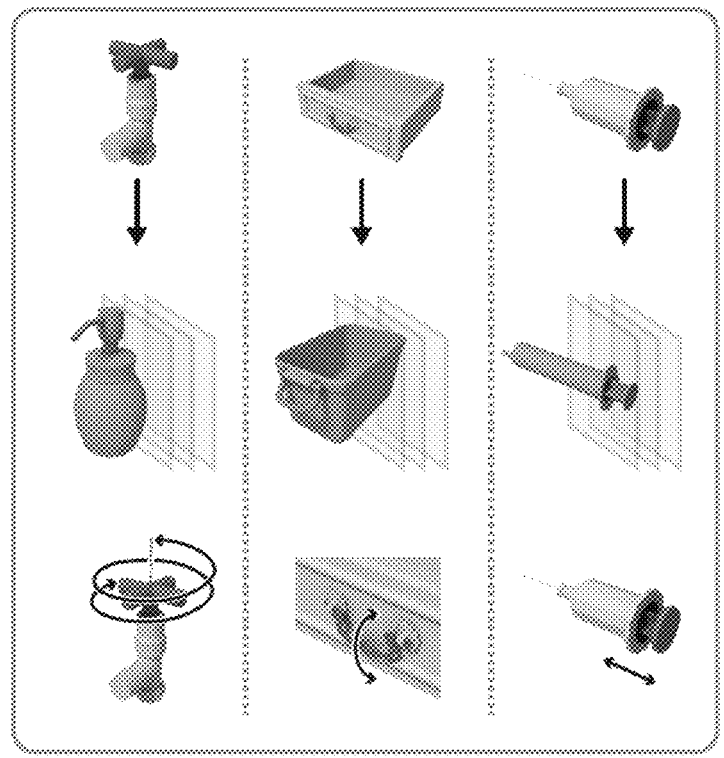

FIG. 5A-5C shows the process of the learning and predicting the part mobility in this invention. The learning is based on a training set of mobility units of different motion types (FIG. 5A). The part mobility model (FIG. 5B) is composed of the start and end snapshots of each unit and a static (snapshot)-to-dynamic (unit) (S-D) mapping function learned from training data. Given a query 3D shape, shown at the bottom of FIG. 5B, the present invention finds the closest mobility unit from the training set via the S-D mapping (FIG. 5B). Aside from motion prediction, the unit also provides a means to transfer its motion to the query shape, as shown in FIG. 5C.

In an embodiment, S202 includes the following steps:

Use the Interaction Bisector Surface to capture the interaction between the moving part and the reference part, and the interaction region between the surface of the parts and Interaction Bisector Surface;

Use the Relation-Augmented Image Descriptor to represent the spatial configuration between the moving part and the reference part.

Replace the 2D pixel in the Relation-Augmented Image Descriptor with the 3D voxel.

Extend the circle in 2D to the sphere in 3D

Use three orthogonal planes in 3D to divide the space of the sphere, and divide the sphere into internal and external spheres by the radius of the sphere and obtain 16 partitions in total.

S202 is the steps of learning S-D mapping. The key idea for defining the S-D mapping is the concept of motion linearity. Linearity of a motion dictates that it is able to identify a start and an end static snapshot for each mobility unit. Moreover, by linearity, the sum of the distances of any intermediate snapshot of the unit to the start and end snapshots remains approximately invariant. Thus, computing the sum of distances from a query static snapshot to the start and end snapshots of a unit provides a meaningful snapshot-to-unit distance, i.e., the distances of any snapshots coming from the same unit do not vary. Using this assumption, the problem of defining the snapshot-to-unit distance is reduced to finding an appropriate distance between snapshots.

The first step to obtain the S-D mapping is to learn a distance measure between two snapshots. To ensure an accurate motion prediction for unseen snapshots, the present invention learns a separate distance measure for each motion type. In the following, more details will be given on the different distance measures that are used in the method.

Snapshot Descriptors

The present invention uses a set of descriptors to represent the configuration of the moving and reference parts appearing in a snapshot. First, the present invention captures the interaction between the two parts with the interaction bisector surface or IBS. The IBS is a subset of the Voronoi diagram computed between the two objects, which captures the spatial region where the objects interact with each other. Moreover, as the geometry of the parts themselves is relevant to their motion, the present invention also captures the regions on the surfaces of the objects that correspond to their IBS, called the interaction regions or IR.

The present invention also represents the relative configuration of the parts with the RAID descriptor. To adapt RAID to our setting, the present invention extends it from 2D to 3D. The present invention replaces pixels by voxels and circles by spheres in the descriptor construction. For the space partitioning within each sphere, the present invention uses the three canonical planes to subdivide 3D space, obtaining 8 spatial partitions. Using an inner and an outer sphere, the present invention obtains 16 partitions in total. Given that the present invention has a larger dimensionality than in the original work, the present invention samples 40,000 points for histogram computation instead of 10,000, and compare descriptors with the earth-mover's distance rather than the L1 metric.

Distance measures.

This invention will define three distance measures that are used by the mobility model.

(1) Snapshot-to-snapshot distance. The distance between two snapshots is a weighted combination of N individual descriptor distances:

$$D_W^S(s_i, s_j) = \sum_{f=1}^{N} w_f D_f^s(s_i, s_j)$$

where $D_f^S(s_i,s_j)$ is the distance between snapshots $s_i$ and $s_j$ for the f-th descriptor, normalized to the range [0,1], $w_f \in W$ lies in the range [0,1] and is the weight for descriptor f, and $\Sigma_f w_f = 1$. Since the sum of weights is one, $D_W^S$ is also in the range [0,1]. Note that this distance depends on the chosen weights W. If different weights are chosen, it can obtain different distance measures as will be described below.

(2) Snapshot-to-unit distance. This measure compares a snapshot to a unit by combining our linearity assumption with the snapshot distance defined above:

$$D^{SU}(s_k^i, u_j) = \frac{1}{2}\left(D_{W_j}^S(s_k^i, s_1^j) + D_{W_j}^S(s_k^i, s_m^j)\right)$$

where $s_1^j$ and $s_m^j$ are the start and end snapshots of unit $u_j$, respectively, and m is the number of snapshots used to represent each unit. The snapshot-to-unit distance is the main tool used in the S-D mapping, where the present invention computes the distances of a snapshot to the units in the training data, and select the unit closest to the snapshot. Note that the present invention uses the weights $W_j$ learned for the unit $u_j$ when invoking the snapshot-to-snapshot distance $D^S$.

(3) Unit-to-unit distance. The present invention also defines a distance between two units, which is used to cluster similar types of units together as explained below:

$$D^U(u_i, u_j) = \frac{1}{m}\sum_{s_k^i \in u_i} D^{SU}(s_k^i, u_j)$$

Note that the unit-to-unit distance is asymmetric since it considers the snapshots of unit $u_i$ and the weights $W_j$ learned for the unit $u_j$ when invoking $D^{SU}$.

In an embodiment, when the S203 is implemented, it learns a snapshot-to-unit distance measure for every motion types of the mobility units by using metric learning method.

To learn an accurate distance function for each type of motion, the present invention takes as input a classification of units into several motion types, and learn a specialized distance for units of each motion type. The present invention defines the distance between snapshots as a weighted combination of geometric descriptor distances, and learn the best combination of descriptors that represents the motion of the mobility units according to its type. The mobility model is thus the combination of the snapshot distances learned for each motion type, in addition to the start and end snapshots of each unit, represented by a set of geometric descriptors.

The goal of S203 is to learn a different set of weights for each motion type, as each type of motion may be better described by different descriptors. The weights W for the snapshot distance $D^S$ are learned from a set of constraints derived from the snapshots in the training data and their specified motion types. While learning the weights, the present invention also takes into account the effect that the weights have when comparing snapshots to units with $D^{SU}$. Thus, the constraints used in the learning ensure that units and snapshots with the same type of motion are kept closer to each other than to units or snapshots with different type of motion. The present invention achieves this with two types of constraints.

Suppose there are three snapshots $\{s_i, s_j, s_k\}$, each coming from a different mobility unit $u_i$, $u_j$ and $u_k$. Let us assume that units $u_i$ and $u_j$ belong to the same motion class, while unit $u_k$ is from another class.

Figure 6A:
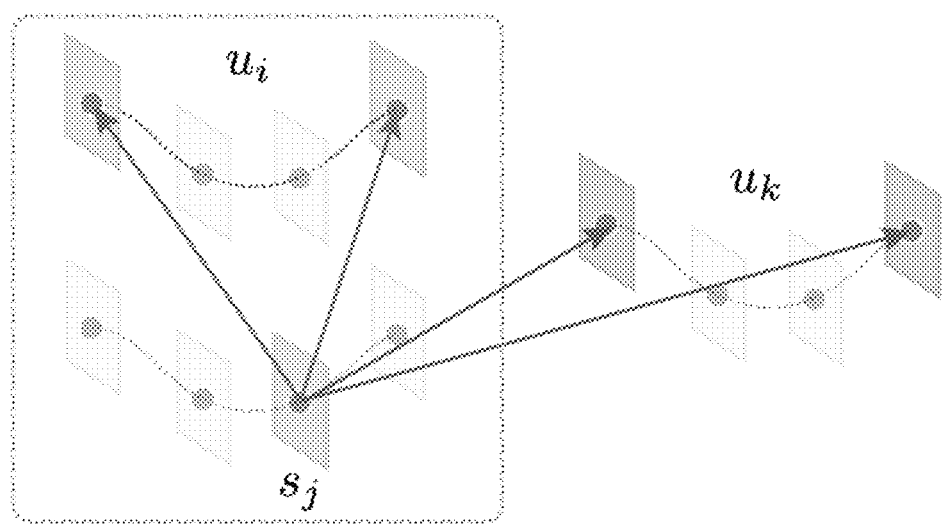
FIG. 6A shows the Type 1 constraint between a snapshot and two units in this invention.

The Type 1 constraints (illustrated in FIG. 6A) capture the notion that snapshots (e.g., $s_j$) should be kept closer to units with the same type of motion as themselves (e.g., $u_i$), rather than to units with a different type of motion (e.g., $u_k$). Therefore, a constraint on comparing one snapshot to two different units can be derived:

$$D^{SU}(s_j, u_i) < D^{SU}(s_j, u_k).$$

Figure 6B:
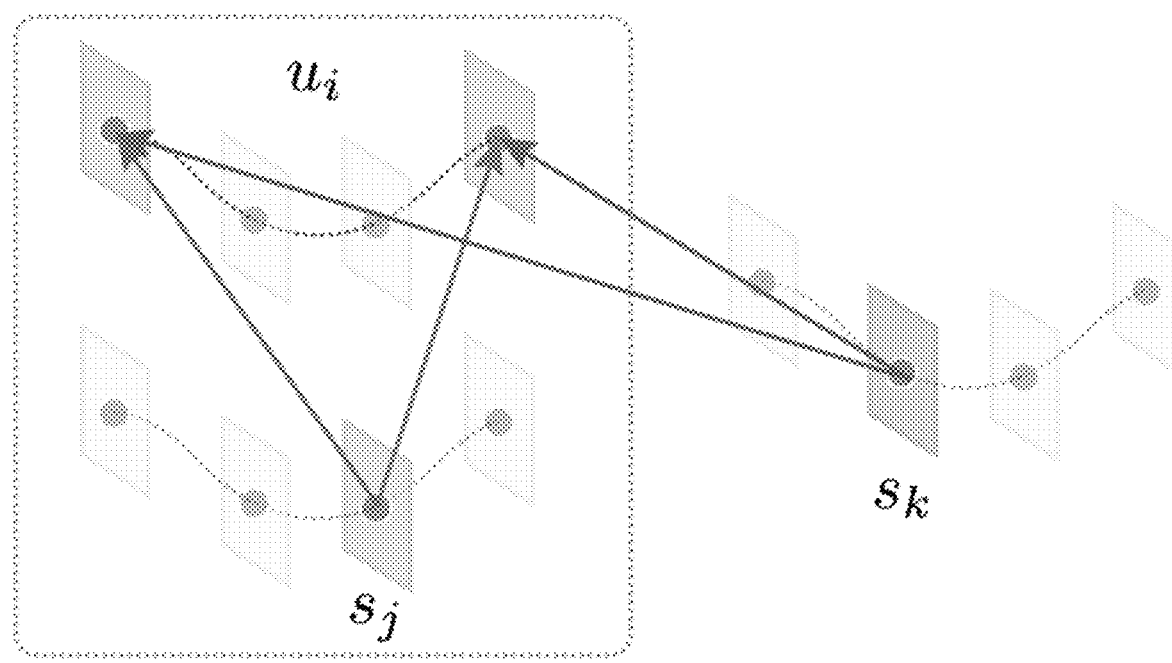
FIG. 6B shows the Type 2 constraint between two snapshots and a unit in this invention.

Type 2 constraints (illustrated in FIG. 6B) capture the notion that the distance from snapshots of the same type as the unit should be smaller than the distance from snapshots not of the same type as the unit. Therefore, a constraint on comparing two snapshots to the same unit can be derived:

$$D^{SU}(s_j, u_i) < D^{SU}(s_k, u_i).$$

Clustering of Units.

Figure 7:
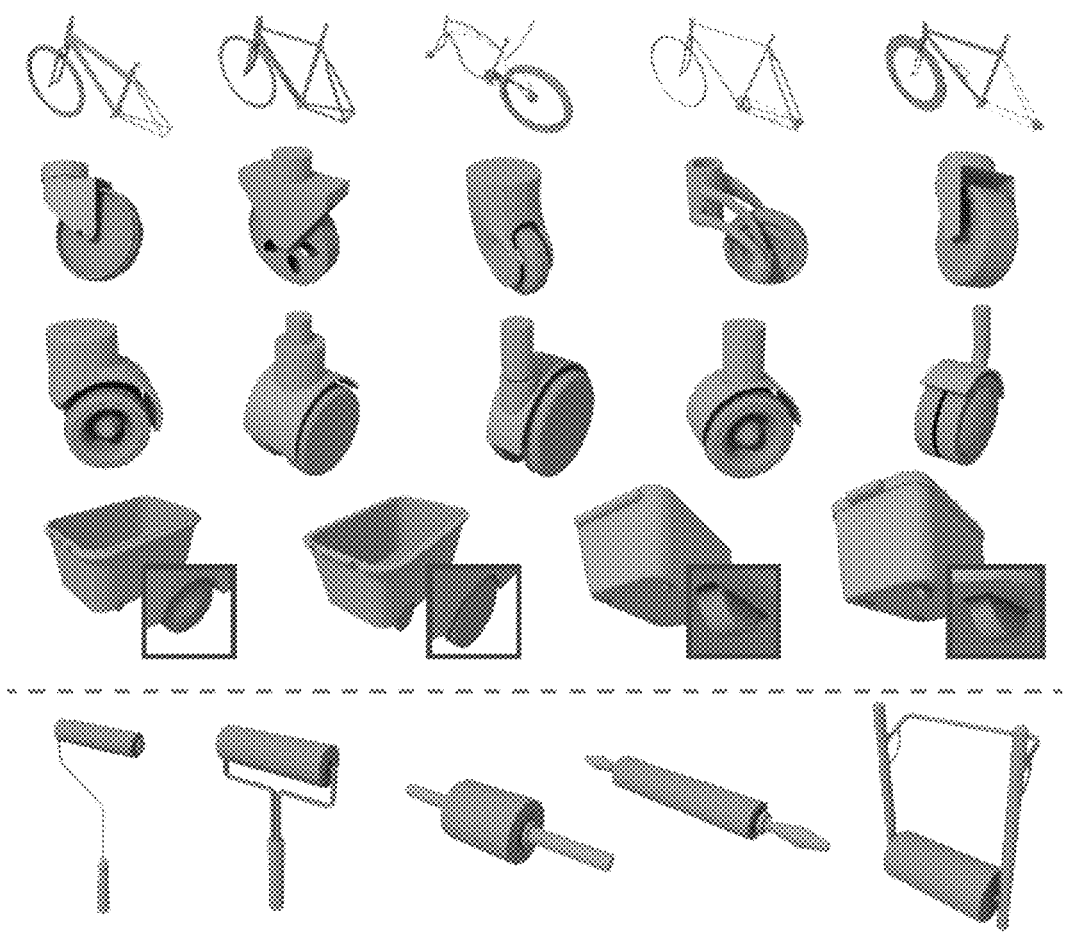
FIG. 7 shows the examples of selected clusters of motion type in this invention.

If the training data is large, the number of derived constraints may be prohibitive for learning the distance in practice. Thus, the present invention systematically subsamples a tractable number of constraints. To subsample, the present invention first clusters each input motion type into smaller groups of similar units (see FIG. 7 for examples). This allows us to reduce the number of constraints by defining constraints only in terms of clusters, where the number of clusters is significantly lower than the number of units.

The present invention performs the clustering with the affinity propagation method. The advantage of this method is that it does not depend on a good initial guess to yield reasonable clustering results, and it automatically selects the number of clusters based on the distance between units and an estimate of how likely each unit is a cluster center. The present invention sets this estimate for a unit as the median distance from the unit to all other units in the set. The output of this process is a clustering of mobility units for each motion type, and a unit selected as center for each cluster, which are then used for defining the constraints.

Constraint Subsampling.

Figure 8:
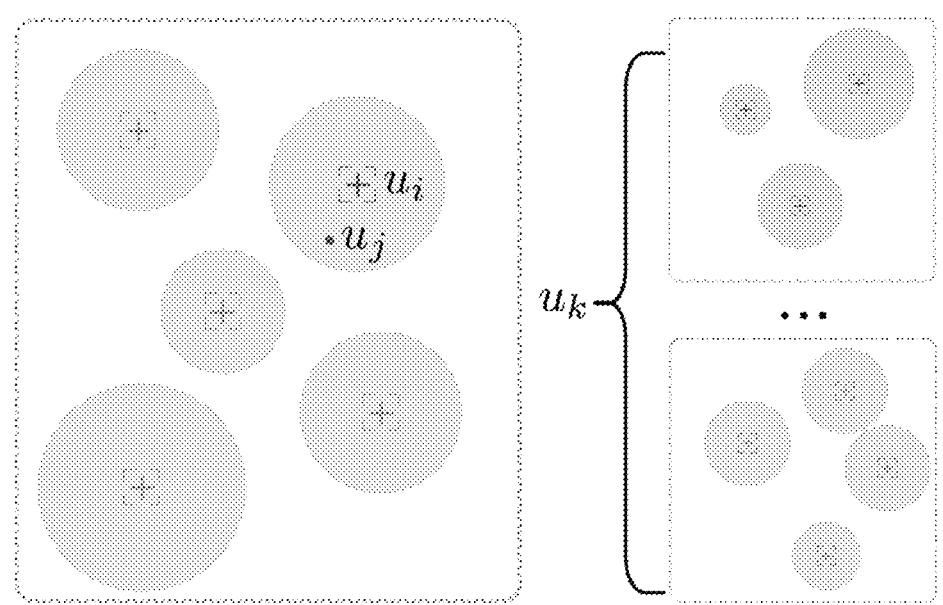
FIG. 8 shows the subsampling the constraints using finer clustering of motion types in this invention.

To define the constraints that involve snapshots $s_j$ of any unit $u_j$ in our dataset, the present invention chooses $u_i$ to be the center of the same cluster of $u_j$, and take $u_k$ to be the center of one of the clusters of a different motion type; see illustration in FIG. 8. Since the present invention follows a nearest neighbor classification approach to define the S-D mapping, it is sufficient to ensure that any snapshot is close to its cluster center. Thus, the present invention does not use additional constraints between snapshots and other cluster centers within the same motion type. This sub sampling reduces the total number of constraints significantly.

Optimization.

The present invention uses the constraints defined above to learn the distance with a method similar to that of Schultz and Joachims, where the main difference is that the present invention constrains the sum of weights with respect to each motion to be one.

Figure 9:
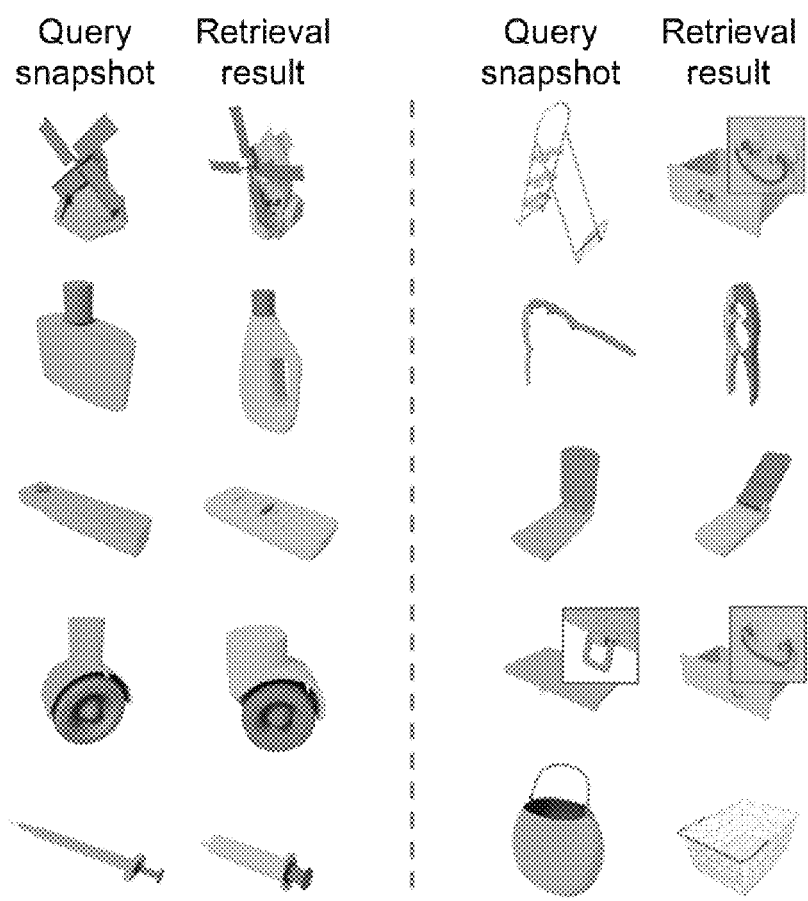
FIG. 9 shows the results of using the part mobility model to predict the part mobility for static snapshots in this invention.

When S204 is implemented, it is able to get the most similar mobility unit and its motion type for a query static snapshot by using the snapshot-to-unit distance measure to select with the minimum distance value. To perform the motion prediction, given a query static snapshot from an unknown unit, the present invention uses the snapshot-to-unit distance defined above to compare the query to the units in the training data, and selects the unit that is the most similar to the query. As illustrated in FIG. 9, it can be observed that the part mobility model not only consider the geometry of a model, but also the proper part motion. Then the present invention can transfer the motion from the mobility unit u to the static snapshot q.

S205 is motion transfer. Its goal is to is to find the exact direction and location of the motion axis on q, such that the motion on q is consistent with the motion label of u, but is adapted to the geometry of q's parts.

The main idea of motion transfer is that given one set of candidate refined parameters, the present invention generates additional snapshots for q using the motion defined by the parameters, and compute the distances from the new snapshots to u. The present invention associates the snapshot with the smallest distance to this parameter set. Finally, the present invention selects the parameter set with the smallest distance and use it to define the motion on q.

Figure 10:
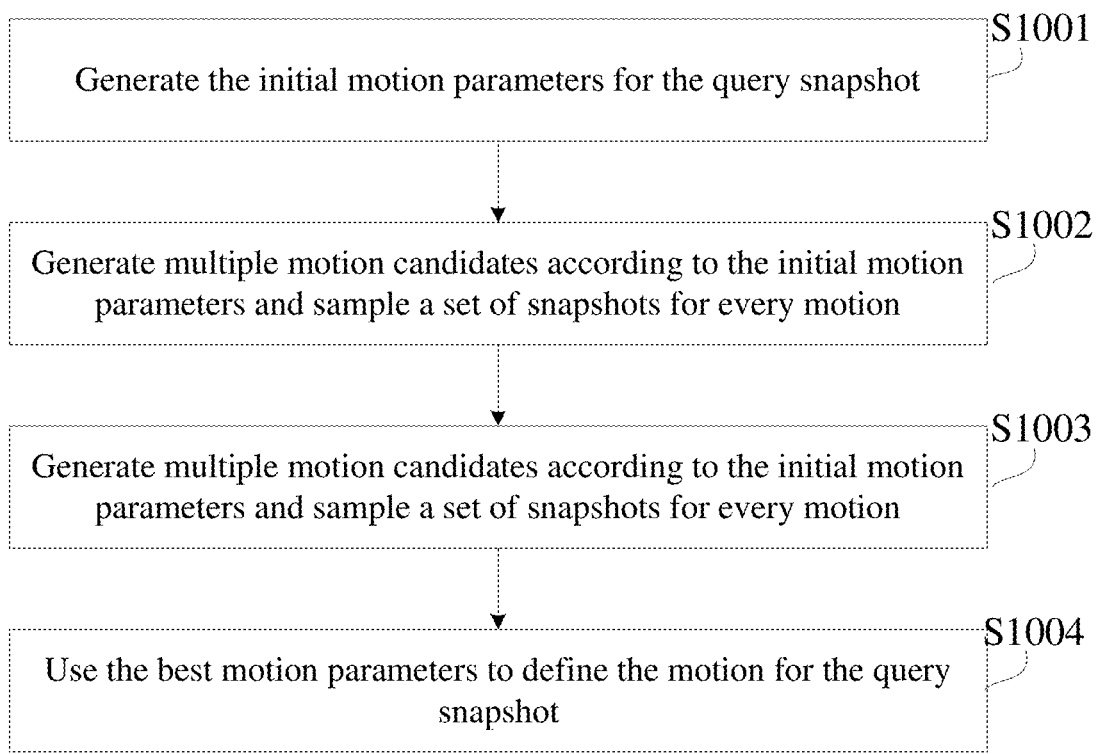
FIG. 10 shows the pipeline of the motion transfer in this invention.

In an embodiment, as illustrated in FIG. 10, S205 include:

S1001: Generate the initial motion parameters for the query static snapshot;

To generate the candidate sets of motion parameters for q, the present invention determines the four motion parameters one by one. First of all, the transformation type of all the candidates should be exactly the same as the transformation type of u.

For the candidate axis, the present invention observes that most man-made objects possess some kind of symmetry and the transformation axis direction and position of the movable parts are usually highly related to the symmetry. Thus, the present invention first computes the symmetry-aligned oriented bounding box (OBB) of the moving part in q, with the OBB computation of Fish et al. [13]. Then, based on the axis direction label of u, which is either "horizontal" or "vertical", each edge of the OBB which follows the prescribed direction provides a candidate direction for the translation or rotation axis. The present invention assumes that the input shapes are upright-oriented, thus an edge direction can be easily classified as vertical or horizontal by computing the angle between the edge direction and the upright direction.

Figure 12:
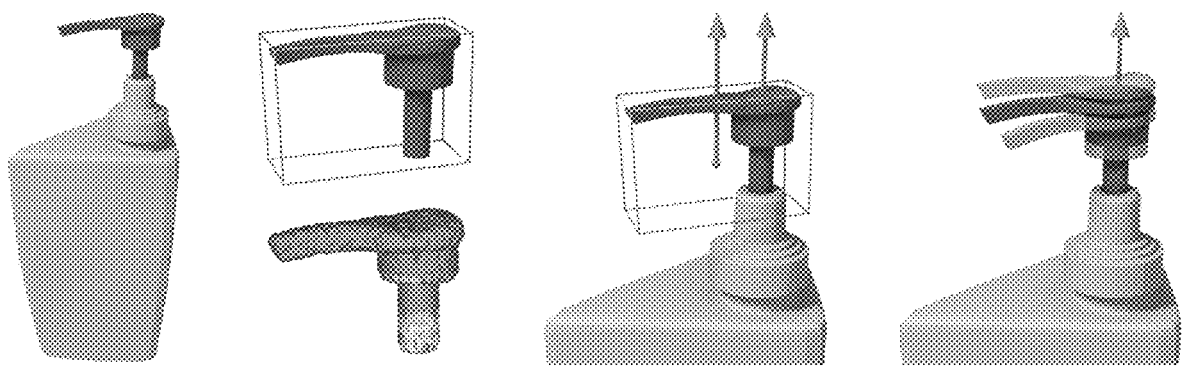
FIG. 12 shows how the motion candidate axes are selected in this invention.

For each candidate axis direction, the present invention further samples multiple candidate positions based on the axis position label of u. For "side" axes, the present invention takes all the edges of the OBB that are parallel to the candidate direction and uses the edge centers to determine the position of the axis. For "central" axes, the present invention selects two points to generate two candidate axes passing through those points. One point is the center of the OBB, while the other is the weighted center of the interaction region (IR) on the moving part, computed according to the weights of points on the shape that indicate the likelihood of the points belonging to the IR. One candidate selection example is illustrated in FIG. 12, the present invention samples different candidates for the motion axis of a query static snapshot, based on the OBB and the IR of the moving part in the snapshot. Then the present invention selects the best candidate as the motion axis of the query shape.

For the transformation range, since the shapes are not aligned, it is not able to directly transfer the motion range from u to q. Thus, the present invention transfers the extent of the range temporarily, and determines the exact motion range for q during motion sampling, as explained below. In the case of rotations, the present invention transfers the rotation angle extent, defined as the difference between the start and end angles. This strategy does not apply to translations, since translation depends on the scale of the shapes, which can differ among units. Thus, for translations, the present invention defines the extent as the length of the translation vector from the start and end positions of the motion. Then, the present invention computes the ratio between the extent and the projection length of the moving part along the motion axis of u. Finally, the extent for q should be the projection length of its moving part along the candidate axis, scaled by the ratio.

S1002: Generate multiple motion candidates according to the initial motion parameters and sample a set of snapshots for every motion;

S1003: Compute the distances between the static snapshots of each set and the predicted mobility unit. Determine the best motion parameters by the set of snapshots with the minimum distance value;

S1004: Use the best motion parameters to define the motion for the query static snapshot.

In an embodiment, the motion type of the best parameters may be the same as that of the predicted mobility unit.

Figure 11:
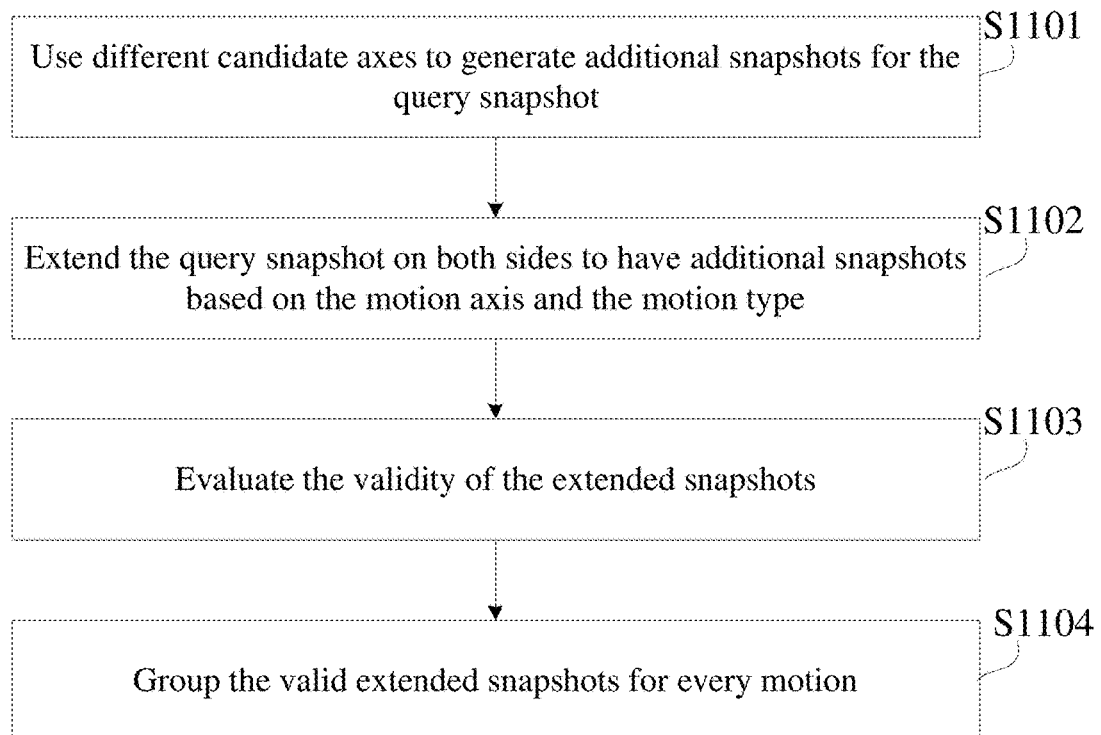
FIG. 11 shows the pipeline of sampling motion for snapshot in this invention.

In an embodiment, as illustrated in FIG. 11, S1002 includes:

S1101: Use different candidate axes to generate additional snapshots for the query static snapshot;

S1102: Extend the query static snapshot on both sides to have additional snapshots based on the motion axis and the motion type;

S1103: Evaluate the validity of the extended snapshots;

S1104: Group the valid extended snapshots for every motion.

When S1102 is implemented, it can be carried out according to rotation or translation.

For translation, translating the moving part starting from of the query static snapshot along the two possible directions of the translation axis;

For rotation, rotating the moving part in two possible directions of the rotation axis of the query static snapshot.

To generate additional snapshots for q using a candidate axis, the present invention treats q as the center of the motion and extend the motion to each "side" of q according to the motion axis and transformation type. That is, the present invention either translates the moving part along the two possible directions of a translation axis starting from q, or rotates the part around a rotation axis at q into the two rotational directions. The motion range of q is determined from how far the expansion went.

The present invention uses different candidate axes to generate additional snapshots for the query static snapshot.

The present invention extends the query static snapshot on both sides to have additional snapshots based on the motion axis and the motion type. During the expansion, for translation, translating the moving part starting from of the query static snapshot along the two possible directions of the translation axis. For rotation, rotating the moving part in two possible directions of the rotation axis of the query static snapshot.

During the expansion from q, the present invention samples the geometry to create additional snapshots and check if the newly sampled snapshots are valid or not. Specifically, the present invention starts with a sample interval distance 1, and creates a new motion snapshot a distance 1 away from q to each side of q. The snapshot is created by either translating the moving part 1 units along the translation axis or sampling direction, or by rotating the moving part an angle of 1 degrees around the rotation axis. Next, if a snapshot is valid, the present invention attempts to continue the expansion along its side. The present invention stops when no further expansion can be done.

When S1103 is implemented, the validity of the expanded snapshots can be judged from the collision and non-collision situation:

In the case of the two parts collide, judge if most of the intersection is confined to the interaction region of the reference part. If true, the snapshot is valid;

In the case of there is no collision, judge if closest distance between the moving and the reference parts are smaller than twice the set threshold. If true, the snapshot is also valid.

A snapshot is valid if the moving part remains connected to the reference part during the motion, but without significant intersection between the parts. In more detail, a snapshot is valid in two cases:

(1) If the two parts collide, most of the intersection should be con ned to the IR of the reference part, since it is expected that collisions can happen in this region.

(2) If there is no collision, the moving and reference parts should remain as close as possible. The closest distance between the moving and the reference parts in the query static snapshot provides a reasonable threshold for this closeness constraint. In our implementation, a sampled snapshot is valid as long as the two parts are not further apart than twice this threshold. If the threshold is zero, the parts should remain connected during the motion.

The present invention introduced a part mobility model and a supervised method to learn it based on metric learning. The present invention showed that the model can be learned from few static snapshots of mobility units, not requiring the use of dense snapshot sequences capturing the motion of the units. Moreover, the present invention showed with a detailed analysis that the learning creates a meaningful model of part mobilities, which can be used for various applications, including motion prediction, motion-driven object detection, and motion hierarchy construction. The key ingredient of the model is the S-D mapping from static snapshots to dynamic motion units, which can be used to predict the motion of static pairs of parts appearing on one 3D snapshot of an object.

Figure 13:
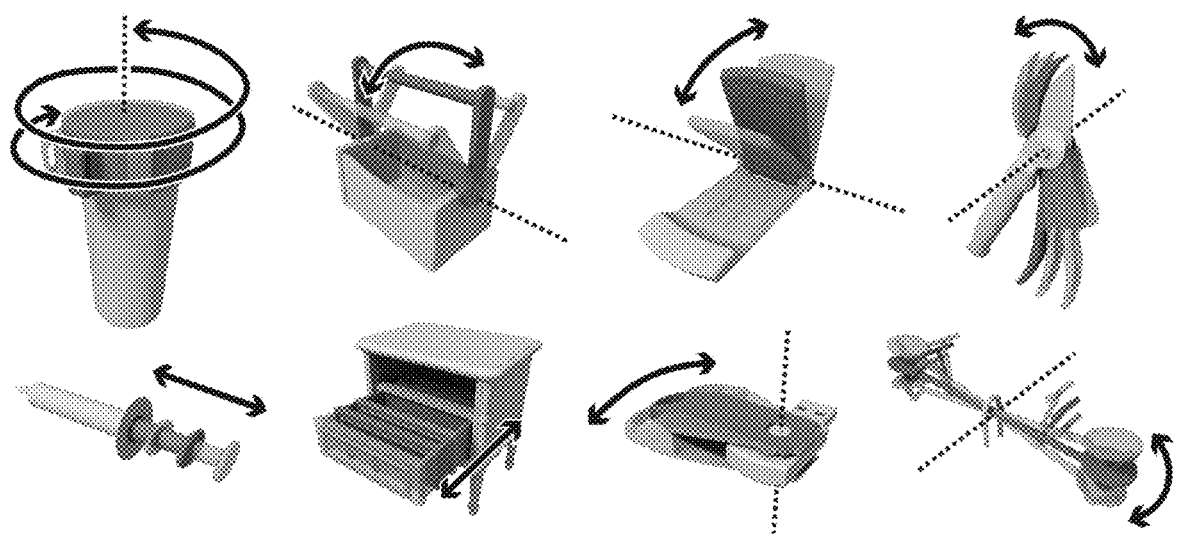
FIG. 13 shows the examples of motion transfer after predicting the correct motion type for each snapshot in this invention.

Through the learning scheme in the present invention, it is able to predict part mobilities based on a static snapshot with high accuracy. An immediate application of mobility prediction is mobility transfer; that is, given an input snapshot, each retrieved mobility unit can transfer the part motion associated with that unit to appropriate parts from the input; see FIG. 13. The prediction model in the present invention also enables other applications, such as motion-driven object detection in 3D scenes.

This invention also provides a computer device comprising: a memory, a processor as well as a computer program stored on the memory and runnable on the processor, characterized in that, the processor executes the following steps when executing the computer program:

Constructing mobility units from each 3D model in a set of 3D models with parts segmented according to their motion and grouping all of the mobility units according to their motion type. The mobility unit contains several static snapshots. The motion types depend on the motion parameters. The motion parameters include: motion type, direction of the candidate axis, position of the candidate axis, and range.

Computing snapshot descriptors for every static snapshot in a mobility unit. The descriptor is represented by several multi-dimensional geometric features, and describes the interaction and spatial configuration between the moving part and the reference part in a static snapshot.

Learning a snapshot-to-unit distance measure for every motion types of the mobility units by using metric learning method.

Getting the most similar mobility unit and its motion type for a query static snapshot by using the snapshot-to-unit distance measure to select with the minimum distance value.

Generating multiple motion candidates for a query static snapshot according to the achieved mobility unit and its motion type. Sampling the generated motion and get the best motion parameter for the query static snapshot.

To achieve such a goal, this invention provides computer-readable storage medium, characterized in that, the computer-readable storage medium stores a computer program and the computer program comprises steps of:

Constructing mobility units from each 3D model in a set of 3D models with parts segmented according to their motion and grouping all of the mobility units according to their motion type. The mobility unit contains several static snapshots. The motion types depend on the motion parameters. The motion parameters include: motion type, direction of the candidate axis, position of the candidate axis, and range.

Computing snapshot descriptors for every static snapshot in a mobility unit. The descriptor is represented by several multi-dimensional geometric features, and describes the interaction and spatial configuration between the moving part and the reference part in a static snapshot.

Learning a snapshot-to-unit distance measure for every motion types of the mobility units by using metric learning method.

Getting the most similar mobility unit and its motion type for a query static snapshot by using the snapshot-to-unit distance measure to select with the minimum distance value.

Generating multiple motion candidates for a query static snapshot according to the achieved mobility unit and its motion type. Sampling the generated motion and get the best motion parameter for the query static snapshot.

Persons skilled in the art shall understand that, the embodiments of the present invention can be provided as a method, a system or a computer program product. Therefore, the present invention can adopt the forms of a full hardware example, a full software example, or combination of a software example and a hardware example. Moreover, the present invention can adopt the form of a computer program product that is implemented on one or more computer-usable storage medium (including but not limited to a disk memory, a CD-ROM, an optical memory, and etc.) including computer-usable program codes.

The invention is described with reference to flow diagrams and/or block diagrams of the method, the device (system) and the computer program product according to the embodiment of the invention. It should be understood that each flow and/or block in the flow diagrams and/or block diagrams, and the combination of the flows and/or blocks in the flow diagrams and/or block diagrams can be achieved by computer program commands. These computer program commands can be provided to a CPU of a general-purpose computer, a special-purpose computer, an embedded processor or other programmable data processing device to produce a machine, so that a device for achieving functions designated in one or more flows in the flow diagrams and/or one or more blocks in the block diagrams can be generated by the command executed by the CPU of the computer or other programmable data processing device.

These computer program commands can also be stored in a computer-readable memory that can guide a computer or other programmable data processing device to operate in a special way, so that the command stored in the computer-readable memory generates a manufactured product including a command device which achieves functions designated in one or more flows in the flow diagrams and/or one or more blocks in the block diagrams.

These computer program commands can also be loaded on a computer or other programmable data processing device, on which a series of operation steps are executed to generate processing achieved by the computer, so that the command executed on the computer or other programmable data processing device is provided for being used in the steps of achieving functions designated in one or more flows in the flow diagrams and/or one or more blocks in the block diagrams.

The invention adopts specific embodiments to explain the principle and implementation way of the invention. The above embodiments are described merely for helping to understand the method and core concept of the invention; in addition, a person skilled in the art can, on the basis of the concept of the invention, make modifications to both of the specific embodiments and application scope. In conclusion, contents disclosed herein should not be understood as limitation to the invention.

The invention claimed is:

1. A method for part mobility prediction based on a static snapshot, characterized in that, the method includes:

constructing mobility units from each 3D model in a set of 3D models with parts segmented according to their motion and grouping all of the mobility units according to their motion type; each of the mobility units contain several static snapshots; the motion types depend on motion parameters; the motion parameters include: type of motion, direction of a candidate axis, position of the candidate axis, and range;

computing snapshot descriptors for every static snapshot in a mobility unit; each of the snapshot descriptors is represented by several multi-dimensional geometric features, and describes interaction and spatial configuration between a moving part and a reference part in a static snapshot;

learning a snapshot-to-unit distance measure for each of the motion types of the mobility units by using a metric learning method;

getting the mobility unit and its motion type for a query static snapshot by using the snapshot-to-unit distance measure to select with a minimum distance value;

generating multiple motion candidates for the query static snapshot according to an achieved mobility unit and its motion type; and sampling the generated multiple motion candidates and getting the best motion parameter for the query static snapshot;

wherein computing snapshot descriptors for every static snapshot in a mobility unit includes:

using an Interaction Bisector Surface to capture the interaction between the moving part and the reference part, and an interaction region between the surface of the parts and the Interaction Bisector Surface; and using a Relation-Augmented Image Descriptor to represent the spatial configuration between the moving part and the reference part:

wherein using the Relation-Augmented Image Descriptor to represent the spatial configuration between the moving part and the reference part, includes:

replacing a 2D pixel in the Relation-Augmented Image Descriptor with a 3D voxel;

extending a circle in 2D to a sphere in 3D; and using three orthogonal planes in 3D to divide the space of the sphere, and dividing the sphere into internal and external spheres by the radius of the sphere and obtaining 16 partitions in total.

2. The method for part mobility prediction based on a static snapshot according to claim 1, characterized in that, the static snapshots in the mobility units include a start snapshot and an end snapshot.

3. The method for part mobility prediction based on a static snapshot according to claim 1, characterized by further comprising a step of: ordering the static snapshots in the mobility unit according to a time sequence of the moving part.

4. The method for part mobility prediction based on a static snapshot according to claim 1, characterized in that, the motion parameter include: motion type, the main direction of the translation axis or rotation axis, the position of the translation axis or rotation axis, motion range.

5. The method for part mobility prediction based on a static snapshot according to claim 1, characterized in that, learning a snapshot-to-unit distance measure for every motion types of the mobility units by using the metric learning method, includes:

using the metric learning method, under the condition of two types of constraints, to learn the snapshot-to-unit distance measure for each motion type of the mobility units according to the geometrical characteristics of the static snapshots in the mobility units; the constraints include:

snapshots be kept closer to the mobility units with the same type of motion as themselves, rather than to the mobility units with a different type of motion; and the distance from snapshots of the same type as the mobility unit be smaller than the distance from snapshots not of the same type as the mobility unit.

6. The method for part mobility prediction based on a static snapshot according to claim 5, characterized by further comprising a step of: grouping the similar mobility units according to the motion types.

7. The method for part mobility prediction based on a static snapshot according to claim 5, characterized by further comprising a step of: constructing the snapshot-to-unit distance measure:

$$D^{SU}(s_k^i, u_j) = \frac{1}{2}\left(D_{W_j}^S(s_k^i, s_1^j) + D_{W_j}^S(s_k^i, s_m^j)\right)$$

where $s_1^j$ and $s_m^j$ are the start and end snapshots of unit $u_j$, respectively, and m is the number of snapshots used to represent each unit; $s_k^i$ is a static snapshot of a mobility unit, $D_{W_j}^S$ is the distance between two static snapshots.

8. The method for part mobility prediction based on a static snapshot according to claim 7, characterized in that, getting the mobility unit and its motion type for a query static snapshot by using the snapshot-to-unit distance measure to select with the minimum distance value includes:

using the distance measure to compare the distances between the query static snapshot and mobility units, choosing the mobility unit with the minimum distance value.

9. The method for part mobility prediction based on a static snapshot according to claim 7, characterized in that, generating multiple motion candidates for the query static snapshot according to the achieved mobility unit and its motion type; sample the generated motion and getting the best motion parameter for the query static snapshot include:

generating initial motion parameters for the query static snapshot;

generating multiple motion candidates according to the initial motion parameters and sampling a set of snapshots for every motion;

computing the distances between the static snapshots of each set and the predicted mobility unit; determining the best motion parameters by the set of snapshots with the minimum distance value;

using the best motion parameters to define the motion for the query static snapshot.

10. The method for part mobility prediction based on a static snapshot according to claim 9, characterized in that, the motion type of the best parameters is the same as that of the predicted mobility unit.

11. The method for part mobility prediction based on a static snapshot according to claim 9, characterized in that, generating multiple motion candidates according to the initial motion parameters and sampling a set of snapshots for every motion includes:

using different candidate axes to generate additional snapshots for the query static snapshot;

extending the query static snapshot on both sides to have additional snapshots based on the motion axis and the motion type;

evaluating the validity of the extended snapshots;

grouping the valid extended snapshots for every motion.

12. The method for part mobility prediction based on a static snapshot according to claim 11, characterized in that, extending the query static snapshot on both sides to have additional snapshots based on the motion axis and the motion type includes:

for translation, translating the moving part starting from of the query static snapshot along the two possible directions of the translation axis;

for rotation, rotating the moving part in two possible directions of the rotation axis of the query static snapshot.

13. The method for part mobility prediction based on a static snapshot according to claim 11, characterized in that, evaluating the validity of the extended snapshots includes:

in the case of the two parts collide, judging if most of the intersection is confined to the interaction region of the reference part; if true, the snapshot is valid;

in the case of there is no collision, judging if closest distance between the moving and the reference parts are smaller than twice a set threshold; if true, the snapshot is also valid.

14. A computer device comprising: a memory, a processor as well as a computer program stored on the memory and runnable on the processor, characterized in that, the processor executes the following steps when executing the computer program:

constructing mobility units from each 3D model in a set of 31) models with parts segmented according to their motion and grouping all of the mobility units according to their motion type; each of the mobility unit contains several static snapshots; the motion types depend on motion parameters; the motion parameters include: type of motion, direction of a candidate axis, position of the candidate axis, and range;

computing snapshot descriptors for every static snapshot in a mobility unit; each of the snapshot descriptors is represented by several multi-dimensional geometric features, and describes interaction and spatial configuration between moving apart and a reference part in a static snapshot;

learning a snapshot-to-unit distance measure for each of the motion types of the mobility units by using a metric learning method;

getting the mobility unit and its motion type for a query static snapshot by using the snapshot-to-unit distance measure to select with a minimum distance value;

generating multiple motion candidates for the query static snapshot according to an achieved mobility unit and its motion type; and sampling the generated multiple motion candidates and getting the best motion parameter for the query static snapshot;

wherein computing snapshot descriptors for every static snapshot in a mobility unit includes:
 using an Interaction Bisector Surface to capture the interaction between the moving part and the reference part, and an interaction region between the surface of the parts and the Interaction Bisector Surface; and
 using a Relation-Augmented Image Descriptor to represent the spatial configuration between the moving part and the reference part:

wherein using the Relation-Augmented Image Descriptor to represent the spatial configuration between the moving part and the reference part, includes:
 replacing a 2D pixel in the Relation-Augmented Image Descriptor with a 3D voxel;
 extending a circle in 2D to a sphere in 3D; and
 using three orthogonal planes in 3D to divide the space of the sphere, and dividing the sphere into internal and external spheres by the radius of the sphere and obtaining 16 partitions in total.

15. A non-transitory computer-readable storage medium, characterized in that, the computer-readable storage medium stores a computer program and the computer program comprises steps of:

constructing mobility units from each 3D model in a set of 31) models with parts segmented according to their motion and grouping all of the mobility units according to their motion type; each of the mobility unit contains several static snapshots; the motion types depend on motion parameters; the motion parameters include: type of motion, direction of a candidate axis, position of the candidate axis, and range;

computing snapshot descriptors for every static snapshot in a mobility unit; each of the snapshot descriptors is represented by several multi-dimensional geometric features, and describes interaction and spatial configuration between a moving part and a reference part in a static snapshot;

learning a snapshot-to-unit distance measure for each of the motion types of the mobility units by using a metric learning method;

getting the mobility unit and its motion type for a query static snapshot by using the snapshot-to-unit distance measure to select with a minimum distance value;

generating multiple motion candidates for the query static snapshot according to the achieved mobility unit and its motion type; and sampling the generated multiple motion candidates and getting the best motion parameter for the query static snapshot;

wherein computing snapshot descriptors for every static snapshot in a mobility unit includes:
 using an Interaction Bisector Surface to capture the interaction between the moving part and the reference part, and an interaction region between the surface of the parts and the Interaction Bisector Surface; and
 using a Relation-Augmented Image Descriptor to represent the spatial configuration between the moving part and the reference part:

wherein using the Relation-Augmented Image Descriptor to represent the spatial configuration between the moving part and the reference part, includes:
 replacing a 2D pixel in the Relation-Augmented Image Descriptor with a 3D voxel;
 extending a circle in 2D to a sphere in 3D; and
 using three orthogonal planes in 3D to divide the space of the sphere, and dividing the sphere into internal and external spheres by the radius of the sphere and obtaining 16 partitions in total.

* * * * *